J. K. STEWART.
SPEEDOMETER.
APPLICATION FILED SEPT. 18, 1911.
1,080,308.
Patented Dec. 2, 1913.
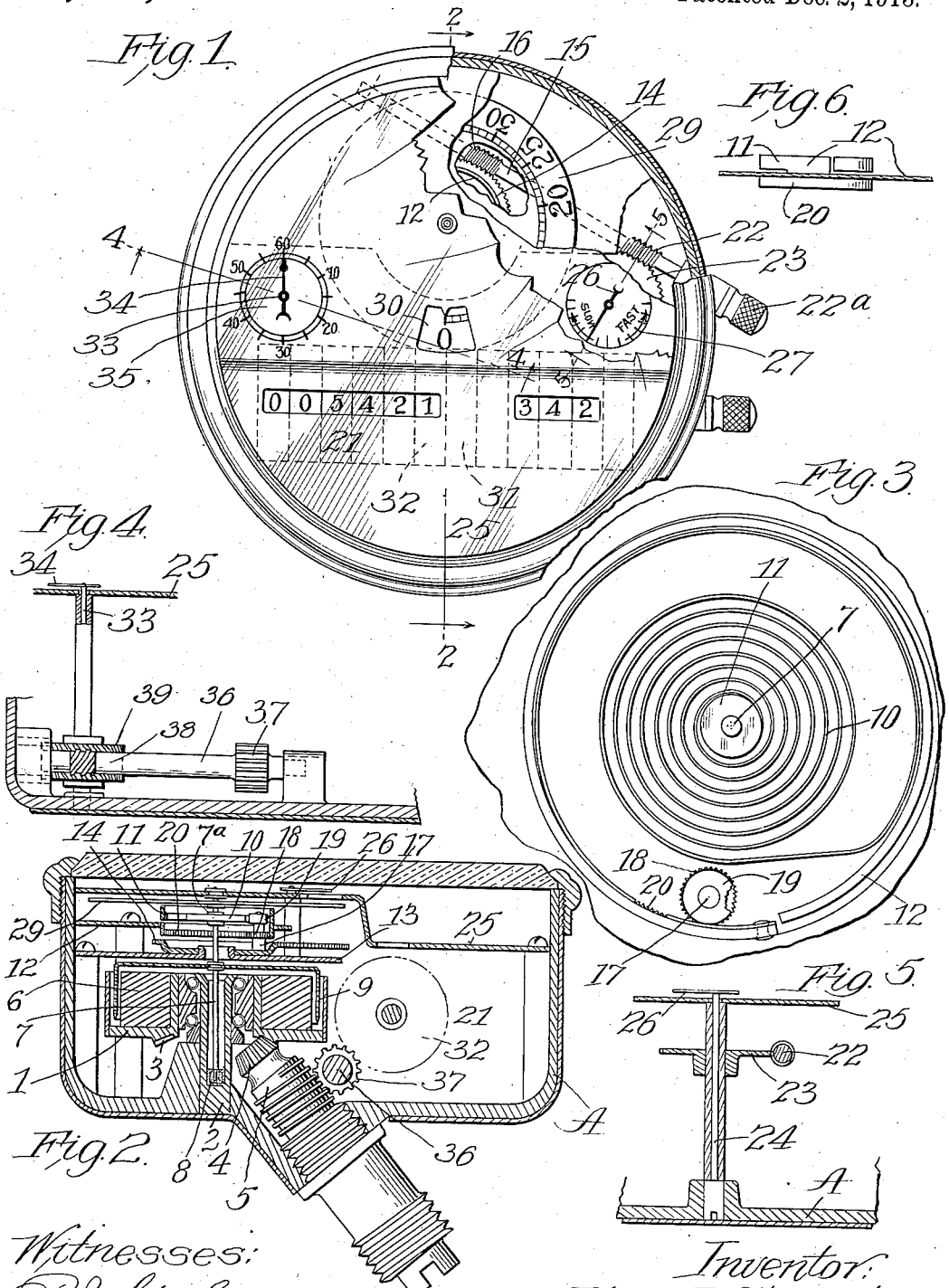
Witnesses:
P. J. Gathmann
Robt. N. Burton
Inventor:
John K. Stewart
By Burton & Burton
his attys.

UNITED STATES PATENT OFFICE.

JOHN K. STEWART, OF CHICAGO, ILLINOIS, ASSIGNOR TO STEWART-WARNER SPEEDOMETER CORPORATION, OF VIRGINIA.

SPEEDOMETER.

1,080,308.　　　Specification of Letters Patent.　　Patented Dec. 2, 1913.

Application filed September 18, 1911. Serial No. 649,817.

*To all whom it may concern:*

Be it known that I, JOHN K. STEWART, a citizen of the United States, residing at Chicago, in the county of Cook and State of Illinois, have invented new and useful Improvements in Speedometers, of which the following is a specification, reference being had to the accompanying drawings, forming a part thereof.
The purpose of this invention is to provide an improved speedometer having means for adjusting at will to compensate for temperature changes or other cause of error, and convenient means for guiding the operator in making such adjustment so as to render the instrument exact by actual test, without requiring knowledge of the temperature or other cause of error on the part of the operator.
It consists in the elements and features of construction shown and described as indicated in the claims.

In the drawings:—Figure 1 is a face view of an instrument embodying this invention.
Fig. 2 is a section at the line 2—2 on Fig. 1. Fig. 3 is an enlarged detail plan view of the helical spring, 10, and its adjusting mechanism. Fig. 4 is a vertical section of the train which operates the index hand, 34, taken, as indicated, at line 4—4 on Fig. 1. Fig. 5 is a sectional detail taken at line 5—5 on Fig. 1. Fig. 6 is a detail view of the plate, 12, with its spring-inclosing flange.

This invention is shown in the drawings as applied to a speedometer of the magnetic type, so-called, and the drawings illustrate the customary features of such an instrument, which will be described without reference to details, but only sufficiently to identify these customary parts in their relation to the features of the construction which embody the invention.

A is the casing, in which there is mounted for rotation a magnet carrier, 1, which is journaled for rotation on a post, 2, upstanding in the case.

3 is a beveled gear rim on the back of the magnet carrier; 4, a pinion meshing with the beveled gear to rotate the carrier; 5, the shaft on which the pinion is mounted, and which, so far as the instrument is concerned, is the shaft whose speed of rotation is to be indicated.

On the magnet carrier, 1, there is mounted a magnet, 6, circular in exterior form.
7 is a spindle stepped in a jewel bearing, 8, provided at the center of the post, 2, and having a second bearing in a transverse plate, 13, mounted fixedly on the casing, A. The spindle, 7, carries an inverted cup or flange disk, 9, whose flange or cup member depends outside the rotating magnet, 6, in position to cut the magnetic field as the magnet revolves. The inverted cup, hereinafter referred to as the biased member, is biased against the entrainment which results from the rotation of the magnetic field by a helical spring, 10, having its inner end secured to a collet, 7ª, fastened on the spindle, 7, of the biased element above the plate, 13, and the outer end secured to an annular guard, 11, which is mounted so as to project as a flange from the inner circumference of an annular plate, 12, which is mounted upon the casing wall parallel to the plate, 13.

Above the plate, 13, there is journaled thereon for rotation about the axis of the spindle, 7, a worm gear, 14, and on the plate, 13, there is mounted a shaft, 15, having a worm, 16, meshing with the worm gear, 14, for rotating it about the axis of the spindle. On the upper side of the worm gear there is mounted upon a stud bearing pin, 17, a fine-toothed gear pinion, 18, and rigid and preferably integral therewith a roller or smooth wheel, 19, the pitch diameter of the gear and the outer diameter of the roller being the same. The helical spring, 10, has its outer coil somewhat widely spaced from the next coil to allow space for the roller, 19, to travel freely between the two coils as the worm gear, 14, is rotated about the axis of the spindle. The roller is positioned for binding said outer coil of the helical spring firmly against the guard flange, 11; and to 59 insure the spring being firmly held without fitting the parts too tightly, said guard is preferably rigid with the supporting plate, 12, only for a short distance at and near the point of fastening thereto of the outer end of the spring, as stated, so that said guard may be flexed slightly inward from the circumference of a circle whose radius is the distance of its secured end from the axis of the spindle, with capacity for yielding outward from that position as the rotation of the worm gear, 14, causes the roll, 19, to press the outer coil of the spring against said guard. The gear pinion, 18, is provided for the purpose of preventing the spring being dragged by the roller as the worm gear is rotated, and this prevention is effected by the meshing of the gear pinion with an annular rack, 20, which projects down from the plate, 12, in proper position for such meshing. Practically, the flange, 11, and the rack, 20, are conveniently made of one piece secured as a flange projecting both ways from the inner circumference of the annular plate, 12, the flange, 11, being severed from the rack through the greater portion of the circumferential extent for the purpose of giving it the elastic action above described. The shaft, 15, carries a second worm, 22, which meshes with a small gear, 23, on a shaft, 24, journaled in the case and extending up through the face plate, 25, in order to carry above said plate an index hand, 26, which plays around a graduated dial, 27, on the face plate, said dial being graduated in opposite directions indicated by the arrows marked "Slow" and "Fast" from a selected point to indicate the adjustment of the speed indicating devices faster or slower. The graduation serves the purpose of noting the steps of adjustment merely for the comparison of one adjustment with another. The shaft, 15, extends out through the side of the case and is provided with a knurled head, 22ª, by which it may be rotated at will to effect the adjustment desired.

The spindle, 7, carries immediately below the face plate a disk, 29, which has an annular marginal area graduated for speed indication, and the face plate has an aperture, 30, for exposing the figures of said graduation as they are carried past said aperture by the movement of the disk with the oscillation of the spindle. In the drawings, the graduation is intended to denote miles per hour of travel of a vehicle to which the speedometer may be attached. Any other form of graduation might be substituted, according to the use to which this instrument is put.

On the shaft, 36, there is a pinion, 37, adapted to actuate a revolution-registering train, which, in the instrument shown designed to indicate travel, is an odometer train, conventionally shown by outlines merely, at 21. The first wheel, 32, of this train, which meshes with the pinion, 37, is designed to make one revolution for each quarter-unit,—as, for example, mile of travel,—registered by the odometer train; and when running at a rate to indicate fifteen miles per hour, this wheel makes one revolution per minute, and is therefore hereinafter termed the "minute" wheel. The shaft of the pinion, 37, is connected through spiral gears, 38 and 39, with a vertical shaft, 33, extending up through the face plate and carrying thereabove an index hand, 34, which revolves over a dial, 35, on the face plate, at the same speed as the minute wheel, 32. The dial is preferably graduated similarly to the dial about the second-hand of a watch or clock; that is, in sub-divisions corresponding to five seconds, or one-twelfth of the circumference. With this construction, it will be seen that when the travel which the instrument is registering (and the speed of which it is indicating) is at the rate of fifteen miles per hour, the index hand, 34, will have movement agreeing exactly with the movement of the second-hand of a watch with which it might be compared. This enables the user to test the accuracy of the speed indication by running the vehicle so that the indicated speed is fifteen miles per hour, and observing the comparison between the movement of the index hand, 34, and the movements of the second hand of a watch. If the index hand fails to traverse the entire circuit of the dial during the minute during which it is compared with the second hand of a watch, the operator will note that the indicated speed,—fifteen miles per hour,—is greater than the true speed; that is, that the indicator is "fast," and it should be corrected by turning the knob, 22ª, to adjust the index, 26, over the dial in the direction of the arrow marked "Slow"; but if the index hand, 34, makes more than one complete circuit of the dial during the minute of comparison, the speed indicated is less than the true speed,—that is, the indicator is slow,—and the adjustment should be made in the opposite direction; that is, so as to move the index, 26, in the direction of the arrow marked "Fast." A little practice will enable the operator to judge accurately how much adjustment is necessary to cure a discrepancy observed between the movement of the second hand of a watch and the movement of the index, 26, over the dial. A second comparison after the first adjustment has been made will show whether the correction has been too little or too great, and a second correction will usually be sufficient to adjust the speed-indicating devices to perfect accuracy.

I claim:—

1. In a speedometer, in combination with a revolving shaft, a revolution indicating device consisting of a dial and an index hand which makes one revolution about such dial in one minute at a pre-determined speed, said dial and index hand being mounted visibly for reading the indications, and a speed indicating device mounted for simultaneous reading of the speed indications, the revolution indicating device being actuated by the revolving shaft, and the speed indicating device being controlled by the speed of said shaft.

2. In a speedometer, in combination with a revolving shaft, a revolution indicating device consisting of a dial and an index hand which makes one revolution about such dial in one minute, at a pre-determined speed, said dial and index hand being mounted visibly for reading the indications, and a speed-indicating device mounted for simultaneous reading of the speed indications, the revolution indicating device being actuated by the revolving shaft, and the speed indicating device being controlled by the speed of said shaft, and means for adjusting the speed-indicating device to compensate for errors.

3. In a speedometer, in combination with a revolving shaft whose speed is to be indicated, a revolution-indicating device consisting of a dial and an index finger which makes one revolution about such dial in one minute at a pre-determined speed, the dial being fractionally graduated, such dial and index hand being mounted visibly for reading their indication, and a speed-indicating device also mounted visibly for simultaneously reading the speed indication, the index hand being actuated by the revolving shaft and the speed-indicating device being controlled by the speed of the same shaft, and means for adjusting the speed-indicating device to compensate for errors.

4. In a speedometer, in combination with a revolving shaft, a speed-responsive device which derives rotative movement from said shaft; a helical spring coiled about the axis of said speed-responsive device and connected to the latter for biasing it against movement in response to the speed of the shaft; an annular guard encompassing said helical spring; a fixed member to which said guard is secured; a gear plate mounted for rotation about the axis of the biased device; a roller journaled on said plate for holding the outer coil of the spring against said guard; a pinion rigid with said roller, and an annular rack mounted on the guard-supporting member for engagement of the pinion, the diameter of the roller and the pitch diameter of the pinion being substantially equal, whereby the roller is positively rotated for rolling on the spring as the plate which carries it is rotated about its axis, and means for so rotating said plate.

5. In a speedometer, in combination with a revolving shaft, a speed-responsive device which derives rotative movement from said shaft; a helical spring coiled about the axis of said speed-responsive device and connected to the latter for biasing it against movement in response to the speed of the shaft; an annular guard encompassing the spring; a fixed member by which the guard is carried; a roller and means by which it is carried for rotation about the axis of the biased device for holding the outer coil of the spring against said annular guard, and means for swinging said roller-carrying member about its axis, the guard being rigid with the plate at a portion not traversed by the roller, and being shaped for normally curving slightly inward from the path of the outer side of the roller for elastic gripping of the spring between the roller and the guard.

6. In a speedometer, in combination with a revolving shaft, a speed-responsive device which derives rotative movement from said shaft; a helical spring coiled about the axis of said speed-responsive device and connected to the latter for biasing it against movement in response to the speed of the shaft; an annular guard encompassing the spring; a fixed member by which the guard is carried; a roller and means by which it is carried for rotation about the axis of the biased device for holding the outer coil of the spring against said annular guard; means for swinging said roller-carrying member about its axis, the guard being rigid with the plate at a portion not traversed by the roller, and being shaped for normally curving slightly inward from the path of the outer side of the roller for elastic gripping of the spring between the roller and the guard; a pinion rigid with the roller having the pitch diameter equal to that of the roller, and an annular rack with which the pinion engages.

7. In a speedometer, in combination with the case, a revolving shaft; a speed-responsive device which derives rotative movement from said shaft; a rotatively-adjustable element whose rotative adjustment regulates the speed responsive device; a shaft mounted in the case and having an operating handle outside the case; means by which the rotation of said shaft adjusts said rotatively adjustable element; an indicator mounted in the case visibly for reading its indication, and means actuated by said last-mentioned shaft for operating said indicator by the same movement of the shaft which adjusts said rotatively adjustable device, whereby said indicator indicates the direction and extent of such adjustment.

8. In a speedometer, in combination with a revolving shaft, a speed-indicating device controlled by the speed of the shaft; a rotatably adjustable element for regulating the speed-indicating device; a manually operable shaft and connections by which to adjust said speed indicator regulating element, and a visibly mounted index operated by said manually-operable shaft for indicating the direction and extent of movement of said element.

In testimony whereof, I have hereunto set my hand, at Chicago, Illinois, this 12th day of September, 1911.

JOHN K. STEWART.

Witnesses:
 CHAS. S. BURTON,
 M. GERTRUDE ADY.